United States Patent
Schütz

(10) Patent No.: US 7,556,709 B2
(45) Date of Patent: Jul. 7, 2009

(54) METHOD FOR MANUFACTURING PLASTIC CONTAINERS FOR LIQUIDS

(75) Inventor: Udo Schütz, Selters/Westerwald (DE)

(73) Assignee: Schütz GmbH & Co. KGaA, Selters/Westerwald (DE)

(*) Notice: Subject to any disclaimer, the term of this patent is extended or adjusted under 35 U.S.C. 154(b) by 674 days.

(21) Appl. No.: 11/083,638

(22) Filed: Mar. 18, 2005

(65) Prior Publication Data
US 2005/0206042 A1   Sep. 22, 2005

(30) Foreign Application Priority Data
Mar. 18, 2004 (DE) .................. 10 2004 013 224

(51) Int. Cl.
- B29C 65/00 (2006.01)
- B29C 65/02 (2006.01)
- B29C 65/18 (2006.01)
- B65D 21/02 (2006.01)

(52) U.S. Cl. .............. 156/256; 156/250; 156/304.1; 156/304.2; 220/23.91

(58) Field of Classification Search .......... 156/250, 156/245, 304.1, 304.2, 499; 220/9.4, 23.91; 206/598, 775, 386; 264/454, 154, 155, 248, 264/249, 250, 512, 515, 523, 531, 534; 228/212, 228/213
See application file for complete search history.

(56) References Cited

U.S. PATENT DOCUMENTS

| | | | | |
|---|---|---|---|---|
| 6,550,514 | B1 * | 4/2003 | Andrew | 156/499 |
| 2003/0173358 | A1 * | 9/2003 | Cassina | 220/9.4 |
| 2004/0069736 | A1 * | 4/2004 | Peronek et al. | 215/42 |

FOREIGN PATENT DOCUMENTS

DE   102 37 808   3/2004

* cited by examiner

Primary Examiner—Mark A Osele
Assistant Examiner—Christopher C Caillouet
(74) Attorney, Agent, or Firm—Friedrich Kueffner

(57) ABSTRACT

In a method for manufacturing a plastic container for liquids, the container is blow-molded to have a securing segment on an outer side of the recess of the front wall for centering and securing the finish-blowmolded container in a welding machine and to have a round depression in the outer side of the recess that has a diameter matching a nominal width of the dispensing valve. The bottom of the round depression is cut by a cutting tool that is centered in the round depression for producing the discharge opening of the container. A fastening flange of the intake socket of the dispensing valve is fused to an outer edge of the discharge opening. Alternatively, a dispensing socket of plastic material having an outer thread is fused to the outer edge of the discharge opening and the dispensing valve is secured on the dispensing socket by a union nut.

2 Claims, 3 Drawing Sheets

METHOD FOR MANUFACTURING PLASTIC CONTAINERS FOR LIQUIDS

BACKGROUND OF THE INVENTION

1. Field of the Invention

The invention relates to a method for manufacturing plastic containers for liquids. The container comprises four sidewalls, a bottom wall, and a top wall. A closable filling socket is provided in the top wall. A dispensing valve of plastic material, in particular, a butterfly valve or a ball valve, comprising a valve housing that has an intake socket and an outlet socket is provided. The intake socket of the valve housing is connected to a discharge opening for receiving the dispensing valve located in a lower recess of the front wall of the container.

2. Description of the Related Art

In a method disclosed in German patent application 102 37 808 A1 for manufacturing a plastic container for liquids with a dispensing valve configured as a butterfly valve and used as a pallet container, a dispensing socket that has been pre-manufactured as a plastic part by injection-molding and comprises an outer thread is introduced into the blow mold and is fused to the container when blow molding the liquid container. After removal of the cooled container from the mold, a cutting tool is inserted into the dispensing socket and a discharge opening is cut out of the container wall with the cutting tool. Subsequently, the dispensing valve is screwed by means of a union nut onto the dispensing socket of the liquid container.

According to another known method for manufacturing plastic containers for liquids with a dispensing valve, the intake socket of the valve housing that is pre-manufactured as a plastic part by injection-molding and inserted into the blow mold is fused to the container when blow-molding the container. After removal of the cooled container from the mold, a discharge opening is cut out of the container-wall by a cutting tool inserted into the valve housing. Subsequently, the closure member and the actuating shaft with the actuating lever are mounted in the valve housing.

According to the two known manufacturing methods, the insertion of the dispensing socket or of the valve housing into the blow mold prolongs the blow-molding cycle; therefore, the production output of the manufacturing facility is reduced. In the second manufacturing process, the assembly steps required for completion of the dispensing valve after blow-molding of the plastic container for liquids additionally reduces the production output of the manufacturing facility.

SUMMARY OF THE INVENTION

It is an object of the present invention to develop a method for manufacturing a container for liquids provided with a dispensing valve which method, in comparison to known manufacturing methods, provides for an increased production output.

In accordance with the present invention, this is achieved in that the container is blow-molded to have at least one securing segment on the outer side of the recess of the front wall of the container for centering and securing the finish-blowmolded container in a welding machine and to have a round depression in the outer side of the recess that has a diameter matching the nominal width of a dispensing valve, wherein a bottom of the round depression is cut by means of a cutting tool centered in the depression for producing the discharge opening of the container, and wherein the dispensing valve is fused with a fastening flange formed on its intake socket to the outer edge of the discharge opening of the container.

Alternatively, this object is achieved in that the container is blow-molded to have at least one securing segment on the outer side of the recess of the front wall of the container for centering and securing the finish-blowmolded container in a welding machine and to have a round depression in the outer side of the recess that has a diameter matching the nominal width of a dispensing valve, wherein a bottom of the round depression is cut by means of a cutting tool centered in the depression for producing the discharge opening of the container, and wherein a dispensing socket of plastic material having an outer thread is fused to the outer edge of the discharge opening of the container for securing the dispensing valve thereto by screwing a union nut thereon.

DESCRIPTION OF THE PREFERRED EMBODIMENTS

Figure 1:
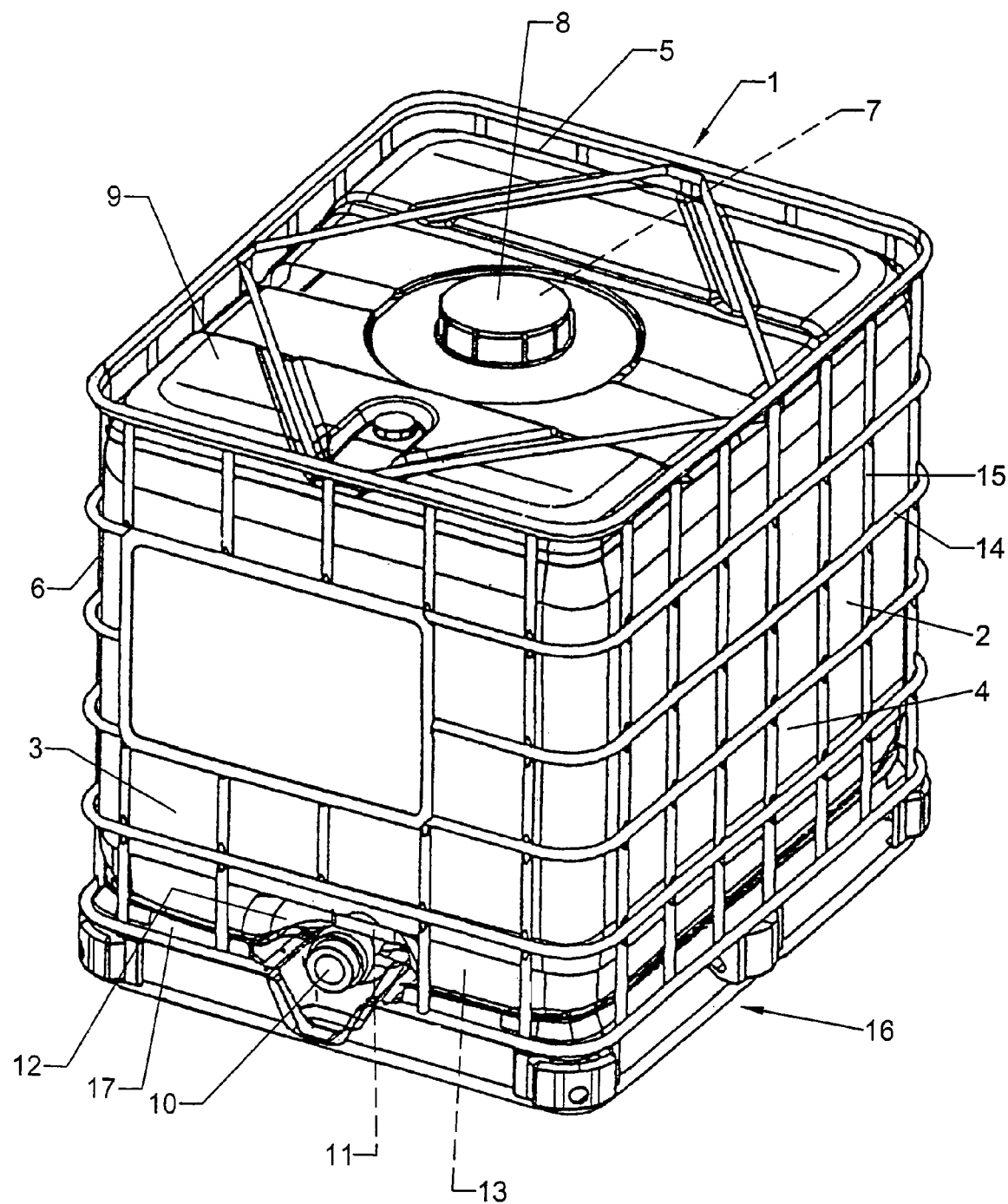
FIG. 1 is a perspective illustration of a plastic container for liquids configured as a pallet container and comprising a dispensing valve.

The transport and storage container 1 according to FIG. 1 that can be used as a disposable or reusable container has as main components an exchangeable parallelepipedal container 2 of plastic material for liquids comprised of four sidewalls 3-6, a top wall 9 provided with a filling socket 7 closable by a lid 8, and a bottom wall 13. A dispensing valve 10 is connected to a discharge opening 11 provided in the curved recess 12 of the front wall 3 of the container 2 in the area of the bottom wall 13 of the container 1 for receiving the dispensing valve. The container 1 moreover comprises an outer jacket of rods 14, 15 made of metal that are arranged horizontally and vertically so as to cross one another. A pallet-shaped support frame 16 having length and width measurements that match the European standard is provided with a flat tub-shaped bottom 17 of sheet metal for supporting the plastic container 2.

Figure 2:
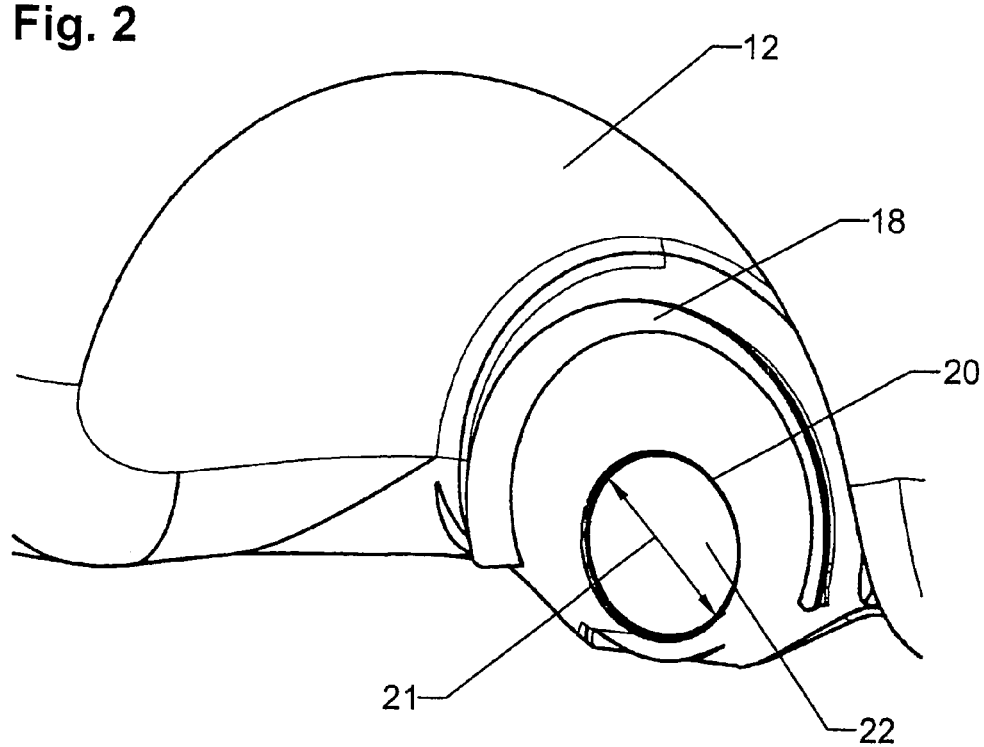
FIG. 2 is an enlarged perspective illustration of the discharge area of the blow-molded plastic container for liquids.
Figure 3:
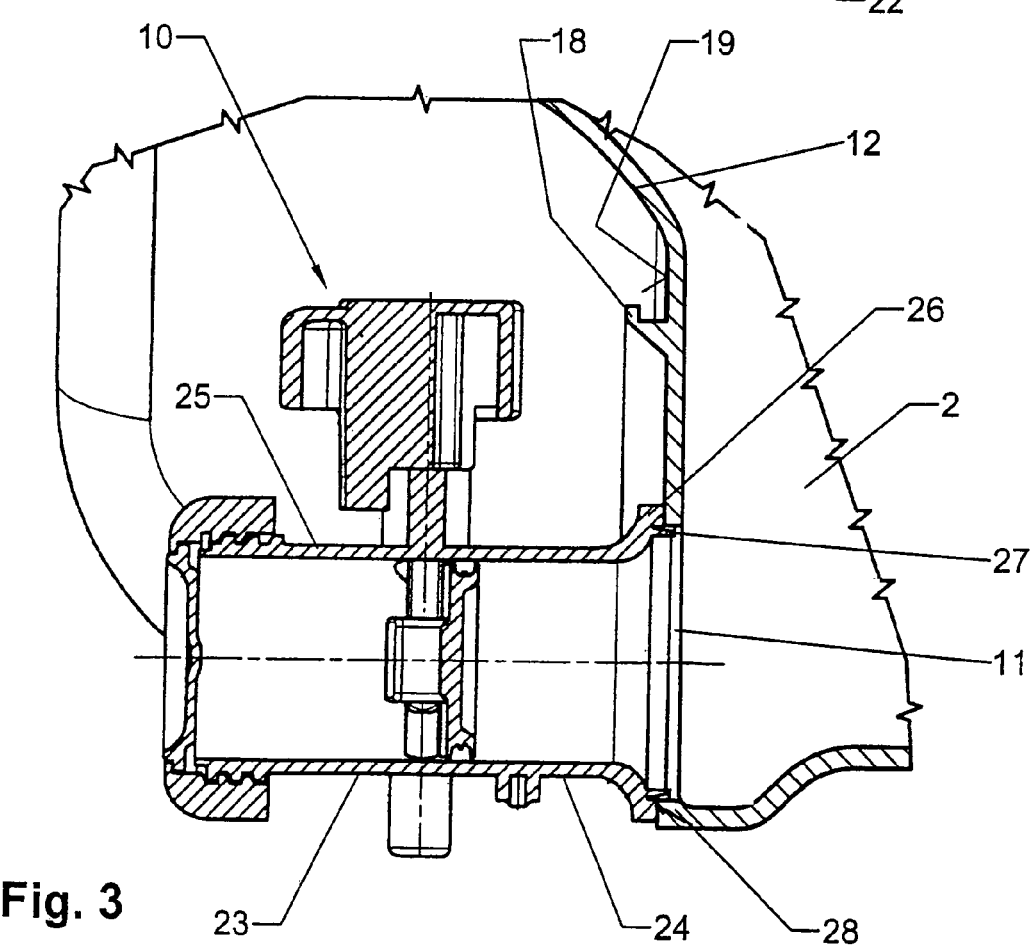
FIG. 3 is a longitudinal section of the discharge area of the plastic container for liquids with a dispensing valve fused thereto.

The plastic container 2 for receiving liquids is blow-molded so as to have a ring-shaped securing segment 18 on the outer side 19 of the recess 12 of the container front wall 3 for centering and securing the finish-blowmolded container 2 in the welding machine and to have a round depression 20 in the outer side 20 of the recess 12 (FIG. 2). The depression 20 has a diameter 21 that matches the nominal width of the dispensing valve 10 formed as a butterfly valve or a ball valve. After removal of the cooled container 2 from the mold, the bottom 22 of the depression 20 is cut by means of a cutting tool centered within the depression 20 for producing the discharge opening 11 of the container 2. Subsequently, the dispensing valve 10 whose injection-molded plastic housing 23 is provided with an intake socket 24 and an outlet socket 25 is welded with a fasting flange 26, formed at the intake socket 24 and centered by an annular projection 27 in the discharge opening 11 of the container 2, to the outer edge 28 of the discharge opening 11 by means of a butt-welding machine (FIG. 3).

Figure 4:
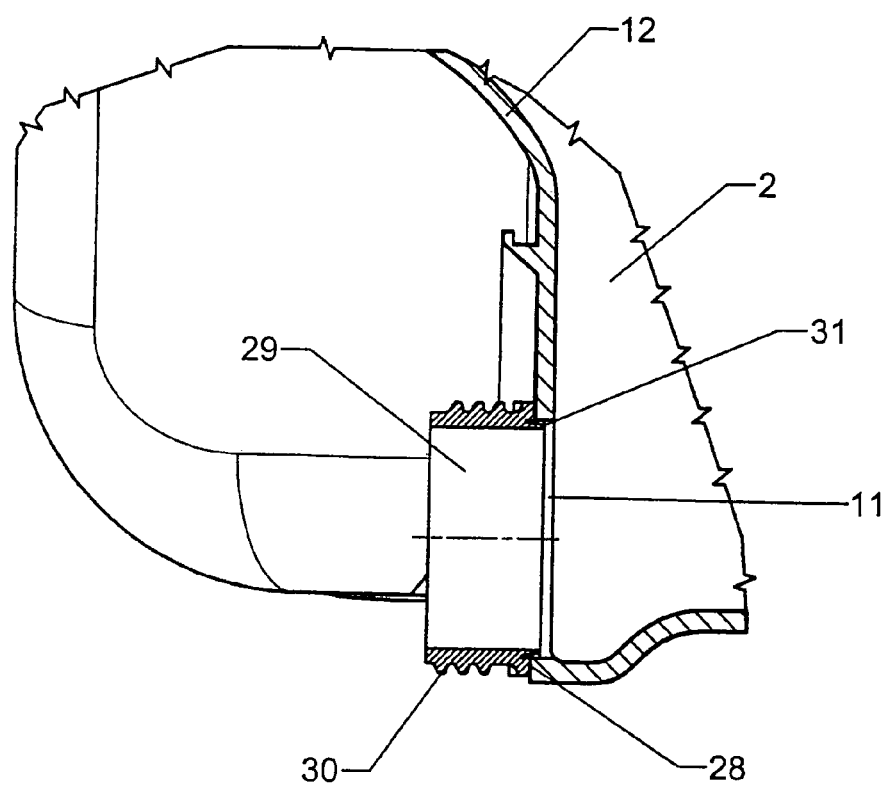
FIG. 4 is a longitudinal section of the discharge area of a plastic container for liquids with the dispensing socket fused thereto.
Figure 5:
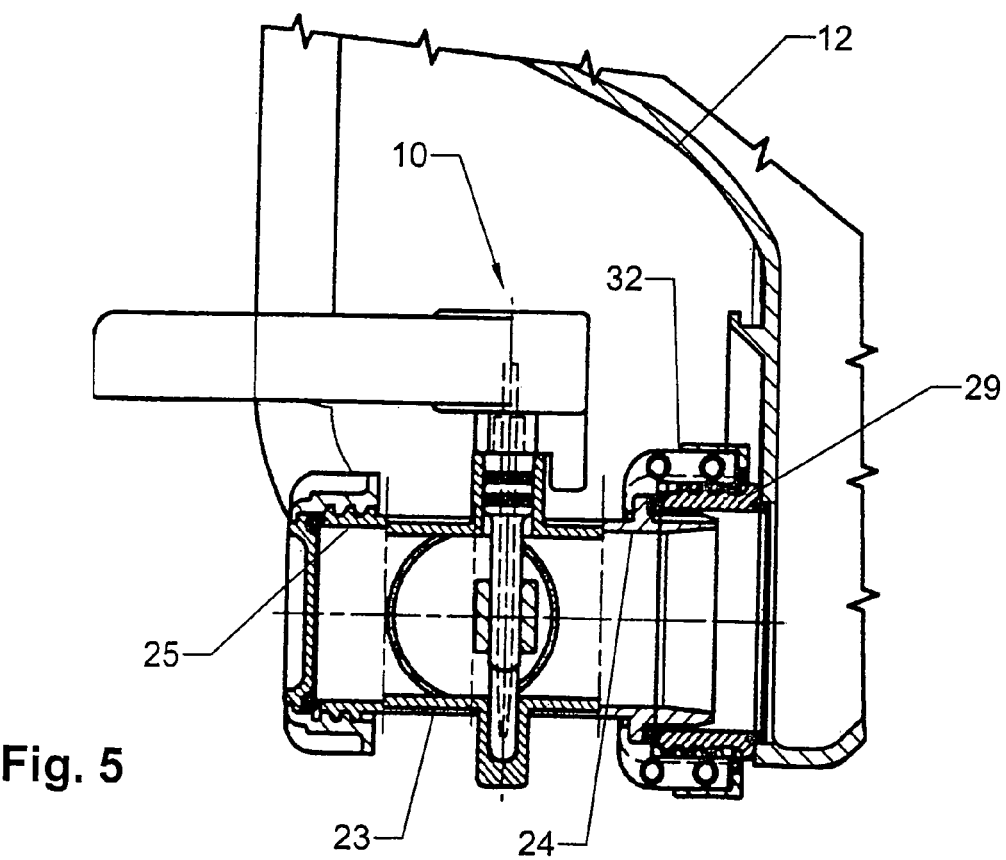
FIG. 5 is a longitudinal section of the discharge area of the plastic container for liquids showing the dispensing socket fused thereto according to FIG. 4 and a dispensing valve connected thereto by screwing.

According to another method illustrated in FIGS. 4 and 5 for manufacturing a plastic container 2 provided with a dispensing valve 10, a dispensing socket 29 that is manufactured as an injection-molded part and provided with an outer thread 30 is fused to the outer edge 28 of the discharge opening 11 of the container 2 by means of a butt-welding machine. The dispensing socket 29 is centered by an annular projection 31 formed thereon in the discharge opening 11 of the container 2. The pre-assembled dispensing valve 10 is secured by means of the union nut 32 secured on the intake socket 24 to the discharge socket 29 fused to the plastic container 2 for liquids by screwing the nut 32 onto the thread 30.

While specific embodiments of the invention have been shown and described in detail to illustrate the inventive principles, it will be understood that the invention may be embodied otherwise without departing from such principles.

What is claimed is:

1. A method for manufacturing a plastic container for liquids, wherein the plastic container comprises four sidewalls, a bottom wall, and a top wall, a closable filling socket provided in the top wall, a dispensing valve made of plastic material and comprising a valve housing that has an intake socket and an outlet socket and connected with the intake socket to a discharge opening of the plastic container located in a lower recess of a front wall of the container; the method comprising the steps of:

blow-molding the container so as to have at least one protruding securing segment on an outer side of the recess of the front wall of the container for centering and securing the finish-blowmolded container in a welding machine and so as to have a round depression in the outer side of the recess that has a diameter matching a nominal width of the dispensing valve;

cutting a bottom of the round depression by a cutting tool that is centered in the round depression for producing the discharge opening of the container;

fusing a fastening flange formed on the intake socket of the dispensing valve to an outer edge of the discharge opening of the container by butt-welding.

2. A method for manufacturing a plastic container for liquids, wherein the plastic container comprises four sidewalls, a bottom wall, and a top wall, a closable filling socket provided in the top wall, a dispensing valve made of plastic material and comprising a valve housing that has an intake socket and an outlet socket and connected with the intake socket to a discharge opening of the plastic container located in a lower recess of a front wall of the container; the method comprising the steps of:

blow-molding the container so as to have at least one protruding securing segment on an outer side of the recess of the front wall of the container for centering and securing the finish-blowmolded container in a welding machine and so as to have a round depression in the outer side of the recess that has a diameter matching a nominal width of the dispensing valve;

cutting a bottom of the round depression by a cutting tool that is centered in the round depression for producing the discharge opening of the container;

fusing a dispensing socket of plastic material having an outer thread to an outer edge of the discharge opening of the container by butt-welding;

securing a dispensing valve on the dispensing socket by a union nut.

\* \* \* \* \*